(12) United States Patent
Weston-Dawkes et al.

(10) Patent No.: US 7,197,241 B2
(45) Date of Patent: Mar. 27, 2007

(54) OPTICAL TRANSMISSION SYSTEMS INCLUDING OPTICAL PROTECTION SYSTEMS, APPARATUSES, AND METHODS

(75) Inventors: Jonathan L. Weston-Dawkes, Ellicott City, MD (US); Adel A. M. Saleh, Holmdel, NJ (US)

(73) Assignee: Corvis Corporation, Columbia, MD (US)

( * ) Notice: Subject to any disclaimer, the term of this patent is extended or adjusted under 35 U.S.C. 154(b) by 365 days.

(21) Appl. No.: 10/373,555

(22) Filed: Feb. 25, 2003

(65) Prior Publication Data

US 2003/0215231 A1 Nov. 20, 2003

Related U.S. Application Data

(63) Continuation of application No. PCT/US01/26554, filed on Aug. 24, 2001.

(60) Provisional application No. 60/227,887, filed on Aug. 25, 2000.

(51) Int. Cl.
*G02F 1/00* (2006.01)
*H04B 10/08* (2006.01)
*H04B 17/00* (2006.01)

(52) U.S. Cl. .................... 398/5; 398/3; 398/4; 398/12; 398/19

(58) Field of Classification Search .................... 398/5, 398/12, 18, 2, 3, 4, 19, 45
See application file for complete search history.

(56) References Cited

U.S. PATENT DOCUMENTS

| 5,777,761 | A | * | 7/1998 | Fee ................................ 398/7 |
| 5,982,517 | A | | 11/1999 | Fishman ..................... 359/119 |
| 6,023,452 | A | | 2/2000 | Shiragaki |
| 6,400,476 | B1 | * | 6/2002 | Arecco .......................... 398/9 |
| 6,579,018 | B1 | * | 6/2003 | Li et al. ......................... 398/4 |
| 6,798,991 | B1 | * | 9/2004 | Davis et al. .................. 398/19 |
| 6,856,600 | B1 | * | 2/2005 | Russell et al. .............. 370/244 |
| 6,968,130 | B1 | * | 11/2005 | Pan ................................ 398/5 |
| 6,973,267 | B1 | * | 12/2005 | Arecco et al. ................. 398/4 |

FOREIGN PATENT DOCUMENTS

| EP | 0 809 384 | 11/1997 |
| EP | 0 809 384 A2 | 11/1997 |
| EP | 0 949 777 A3 | 10/1999 |

OTHER PUBLICATIONS

International Search Report for PCT/US01/26554.
Written Opinion for PCT/US01/26554.
International Preliminary Examination Report for PCT/US01/26554.
Communication Pursuant to Article 96(2) EPC.

* cited by examiner

*Primary Examiner*—M. R. Sedighian

(57) ABSTRACT

Optical transmission systems of the present invention include optical protection systems, apparatuses, and methods that provide increased reliability in the system. The optical system generally includes an optical switch having distinct, cooperating dedicated and shared protection sections. The shared protection sections in a plurality of nodes can be configured to provide a protection net, in which a plurality of traffic demands, or working channels, are commonly protected as protection group using one protection channels supported by the protection net.

17 Claims, 14 Drawing Sheets

OPTICAL TRANSMISSION SYSTEMS INCLUDING OPTICAL PROTECTION SYSTEMS, APPARATUSES, AND METHODS

CROSS-REFERENCE TO RELATED APPLICATIONS

This application is a continuation of PCT Patent Application Ser. No. PCT/US01/26554, filed 24 Aug. 2001, which claims priority from U.S. Provisional Patent Application No. 60/227,887, filed 25 Aug. 2000, both of which are incorporated herein by reference.

STATEMENT REGARDING FEDERALLY-SPONSORED RESEARCH AND DEVELOPMENT

Not Applicable.

BACKGROUND OF THE INVENTION

The present invention is directed generally to optical transmission systems. More particularly, the invention relates to optical transmission systems including protection capability for use in optical communication systems.

Communications transport systems are used to transport information-over a substantial portion of the world. This extensive communication access requires enormous amounts of equipment to provide the necessary infrastructure for the systems. In addition, much of the equipment and almost all of the transport media is remotely located and necessarily exposed to the environment.

The necessary exposure of transmission equipment and systems to uncontrolled environments increases the likelihood for failures to occur. However, if communication systems are to be effective it is necessary to have a high degree of reliability in the system. The reliability of service provided by a transmission system is inversely proportional to the frequency of failures in the transmission system.

One of the most common failures in fiber optic transmission systems is a fiber break. When a fiber break or other failure occurs in a transmission link, the traffic intended to pass through the link must be rerouted through another path until the link is restored. Another common source of failures in optical transmission systems is an equipment failure. The amount of traffic that is lost upon an equipment failure depends upon the particular piece of failed equipment in the system. For example, in most, if not all, currently available fiber optic transmission systems, a line amplifier failure will result in a complete loss of traffic traveling through an optical link containing the failed line amplifier. Whereas, a transmitter or a receiver failure will generally result only in the loss of the traffic carried by wavelengths associated with the failed transmitter or receiver. When an amplifier fails or fiber cut occurs, traffic must be rerouted through a new path. When a transmitter or receiver fails, the traffic must be transferred to different transmitter and/or receiver using the same or a different channel and/or transmission path.

Service providers have developed protection schemes to ensure service quality and provide automatic traffic restoration upon a failure in a transmission link. In some instances, redundant equipment systems are employed to decrease the effective failure rate of the link. Protection schemes generally are categorized based on the relationship between a working channel that carries traffic during normal operation and its corresponding protection channel that carries traffic if the working channel is unavailable. If traffic is transmitted simultaneously on both the working channel and the protection channel, the schemes are referred to as providing one plus one ("1+1") protection. Conversely, if traffic is switched from the working channel to the protection channel or from a working path to a protection path only when a failure occurs, the schemes are referred to as one for one ("1:1") protection schemes. More generally, N protection channels or paths can be shared between M working channels or paths, which is generally designated as N:M protection. Similarly, N protection channels can carry the same information as the working channel to provide 1+N protection.

In the event of a failure of one direction of the working path, a destination node for the traffic will switch to the protection path to receive the traffic in 1+1 schemes. In 1:1 schemes, origin and destination nodes are switched to the protection channel in path switched schemes, while nodes adjacent to the failure are switched in line and span switched schemes to route traffic around the failure. Various combinations of path, line, and span switching schemes can also be employed in 1:1 schemes.

In addition, failures in a network are detected by various local controllers in the nodes and must be communicated to the other nodes via the network management systems. The latency involved with providing notification throughout the network via the network management system can complicate and decrease the efficiency of the protection process.

As the demand for transmission capacity continues to grow, there is an increasing need to efficiently use the available transmission capacity and protect the information being transported through the systems. In addition, the increased amount of traffic being carried on each fiber places increased importance on the ability to protect the information effectively, because each failure results in higher revenue losses for service providers. Accordingly, there is a need for optical transmission protection schemes and network configurations that provide effective protection with increasing wavelength efficiencies for use in long distance communication systems.

The continuing interest in developing new filters with improved filtering characteristics is based on the recognition that wavelength separation technology still poses a limitation to the development of higher performance, lower cost communication systems. As such, there is a need to improve continually the optical filters and filtering methods available for use in optical components, subsystems and systems.

BRIEF SUMMARY OF THE INVENTION

The present invention addresses the need for optical transmission systems including optical protection systems, apparatuses, and methods that provide increased reliability in the systems. The optical transmission system generally includes a plurality of optical processing nodes interconnected by optical transmission media, such as optical fiber, via one or more optical paths to form an optical network. Optical nodes can include optical protection apparatuses that allow the optical nodes to operate in a plurality of optical protection modes. For example, dedicated and/or shared protection with or without preemptable services can be provided for optical signal between transmitted in the system.

In various embodiments the optical switch of the present invention includes distinct, cooperating dedicated and shared protection sections. Each section can include various switch fabric architectures, as well as switching technology. In exemplary embodiments, the shared protection section of the optical switch can be added to the node, while the dedicated protection section of the switch is carrying traffic on working channel in the system.

The shared protection sections in a plurality of nodes can be configured to provide a protection net, in which a plurality of traffic demands, or working channels, are commonly protected as protection group using one or more protection channels forming by the protection net. In various embodiments, multiple protection channels can be used to provide layered protection nets, which can be interconnected or operated independently.

Accordingly, the present invention addresses the aforementioned desires to provide optical systems that have increased performance and reliability. These advantages and others will become apparent from the following detailed description.

BRIEF DESCRIPTION OF THE DRAWINGS

Embodiments of the present invention will now be described, by way of example only, with reference to the accompanying schematic drawings for the purpose of illustrating embodiments only and not for purposes of limiting the same, wherein.

DESCRIPTION OF THE INVENTION

Figure 1:
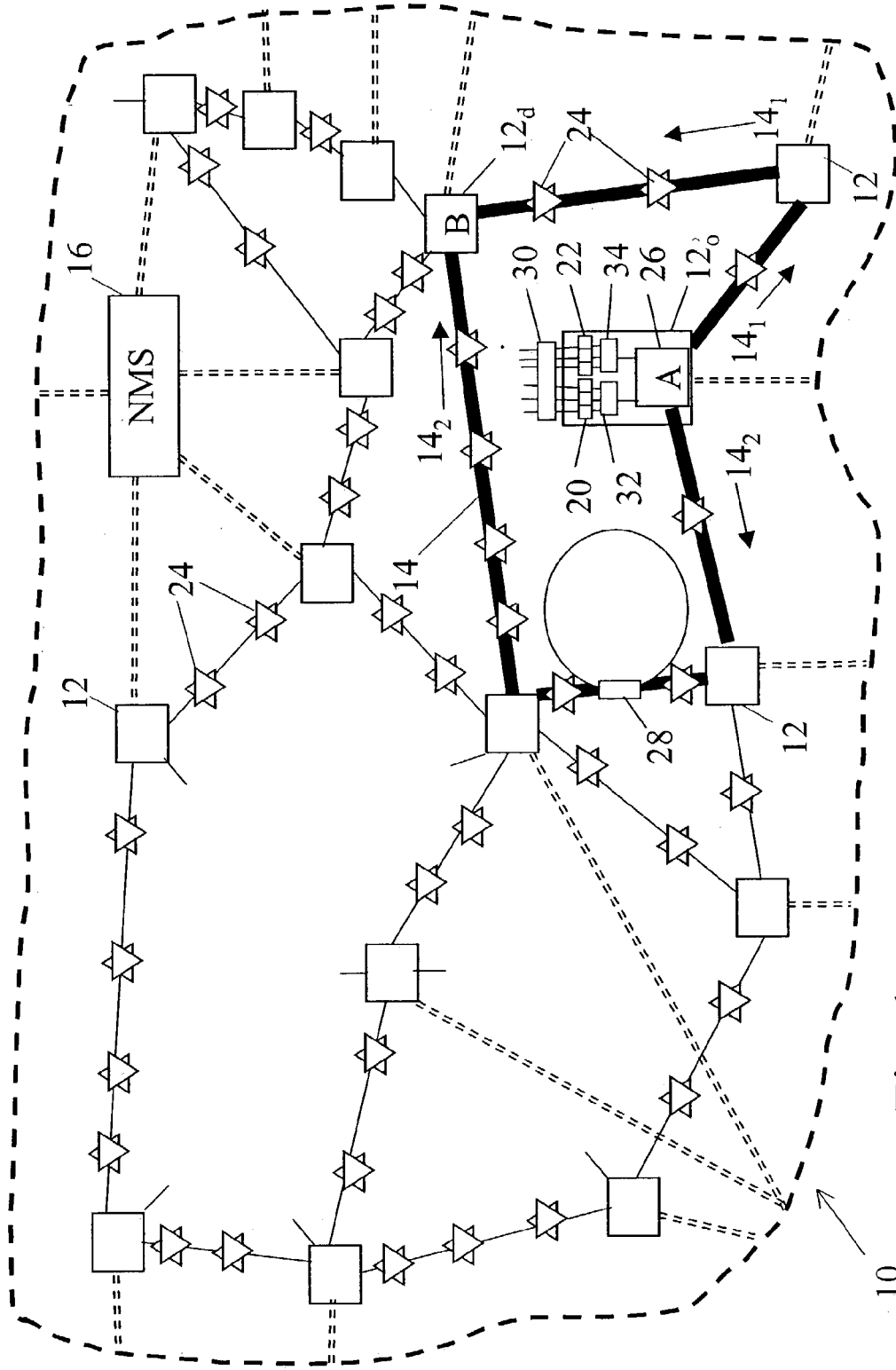
FIGS. 1 and 2 show optical system embodiments.

FIG. 1 illustrates an optical system 10, which includes a plurality of nodes 12 connected by optical communication paths 14. Advantages of the present invention can be realized with many system 10 configurations, topologies, and architectures. For example, an all optical network, one or more interconnected point to point optical links (FIG. 2), and combinations thereof can be configured in various topologies, i.e., rings, mesh, etc. to provide a desired network connectivity.

The system 10 can support one or more transmission schemes, such as space, time, polarization, code, wavelength and frequency division multiplexing, etc., singly or in combination within a network to provide communication between the nodes 12. The system 10 can include various types of transmission media 16 and be controlled by a network management system 18.

As shown in FIG. 1, optical processing nodes 12 generally can include one or more optical components, such as transmitters 20, receivers 22, amplifiers 24, integrated optical switches 26 and optical add/drop multiplexers 28, and dedicated interfacial devices 30. For example, in WDM embodiments, the node 12 can include optical switches 26 and interfacial devices 30 along with multiple transmitters 20, receivers 22, and associated equipment, such as monitors, power supplies, system supervisory equipment, etc.

The optical processing nodes 12 can be configured via the network management system 18 in various topologies. The deployment of integrated transport optical switches 26, and optical add/drop multiplexers 28 as integrated switching devices in intermediate nodes 12$_i$ can provide all-optical interconnections between the transmitters 20 and receivers 22 located in non-adjacent origination and destination nodes, 12$_o$ and 12$_d$, respectively. The use of integrated transport switching devices in the system 10 in this manner provides for distance independent all-optical networks, subnetworks, and/or nodal connections.

In various network embodiments, multiple paths, e.g., 14$_1$ and 14$_2$, can be provided between nodes 12. The optical path 14 between adjacent nodes 12 is referred to generally as an optical link. The optical communication path 14 between adjacent optical components along the link is referred to generally as a span.

Various guided and unguided transmission media 16, such as fiber, planar, and free space media, can be used to form the optical communication paths 14. The media 16 supports the transmission of information between originating nodes 12$_o$ and destination nodes 12$_d$ in the system 10. As used herein, the term "information" should be broadly construed to include any type of audio, video, data, instructions, or other analog or digital signals that can be transmitted.

The transmission media 16 can include one or more optical fibers interconnecting the nodes 12 in the system 10. Various types of fiber, such as dispersion shifted ("DSF"), non-dispersion shifted ("NDSF"), non-zero dispersion shifted ("NZDSF"), dispersion compensating("DCF"), and polarization maintaining ("PMF") fibers, doped, e.g. Er, Ge, as well as others, can be deployed as transmission fiber to interconnect nodes 12 or for other purposes in the system 10. The fiber typically can support either unidirectional or bi-directional transmission of optical signals in the form of one or more information carrying optical signal wavelengths $\lambda_{si}$, or "channels". The optical signal channels in a particular path 14 can be processed by the optical components as individual channels or as one or more wavebands, each containing one or more optical signal channels.

Network management systems ("NMS") 18 can be provided to manage, configure, and control optical components in the system 10. The NMS 18 generally can include multiple management layers, which can reside at one or more centralized locations and/or be distributed among the optical components in the network. The optical components can be grouped logically as network elements for the purposes of network management. One or more network elements can be established at each optical component site in the network depending upon the desired functionality in the network and management system.

The NMS 18 can be connected directly or indirectly to network elements located either in the nodes 12 or remotely from the nodes 12. For example, the NMS 18 may be directly connected to network elements serving as a node 12. For example, a wide area or data communication network ("WAN" or "DCN", shown in broken lines in FIG. 1) can be employed or direct connections to a network element can be provided, via dial up connection or otherwise. Indirect connections to network elements that are remote to the DCN can be provided through network elements with direct connections. Mixed data or dedicated supervisory channels can be used to provide connections between the network elements. The supervisory channels can be transmitted within and/or outside the signal wavelength band on the same medium or a different medium depending upon the system requirements.

Generally, the optical transmitters 20 transmit information as optical signals via one or more signal channels $\lambda_{si}$ through the transmission media 16 to optical receivers 22 located in other processing nodes 12. The transmitters 20 used in the system 10 generally includes an optical source that provides optical power in the form of electromagnetic waves at one or more optical wavelengths. The optical source can include various coherent narrow or broad band sources, such as DFB and DBR lasers, sliced spectrum sources and fiber and external cavity lasers, as well as suitable incoherent optical sources, e.g., LED, as appropriate. The sources can have a fixed output wavelength or the wavelength can be tunable using various feedback and control techniques, such as temperature, current, and gratings or other components or means for varying the resonance cavity of the laser or output of the source.

Information can be imparted to the electromagnetic wave to produce an optical signal carrier either by directly modulating the optical source or by externally modulating the electromagnetic wave emitted by the source. Alternatively, the information can be imparted to an electrical carrier that can be upconverted, or frequency shifted, to an optical signal wavelength $\lambda_{si}$. Electro-optic (e.g., LiNbO$_3$), electro-absorption, other types of modulators and upconverters can be used in the transmitters 20.

In addition, the information can be imparted using various modulation formats and protocols. For example, various amplitude modulation schemes, such as non-return to zero (NRZ), differential encoding, and return to zero (RZ) using various soliton, chirped, and pulse technologies. Various frequency, phase, polarization, and other constant amplitude/power modulation techniques also can be employed separately or in combination. One or more transmission protocols, such as SONET/SDH, IP, ATM, Digital Wrapper, GMPLS, Fiber Channel, Ethernet, etc. can be used depending upon the specific network application. It will be appreciated that the transmitters 20 and receivers 22 can use one or more modulation formats and transmission protocols within the network and convert between formats.

The optical receiver 22 used in the present invention can include various detection techniques, such as coherent detection, optical filtering and direct detection, and combinations thereof. The receivers 22 can be deployed in modules that have incorporated wavelength selective filters to filter a specific channel from a WDM signal or channel filtering can be performed outside of the receiver module. It will be appreciated that the detection techniques employed in the receiver 22 will depend, in part, on the modulation format and transmission protocols used in the transmitter 20.

Generally speaking, N transmitters 20 can be used to transmit M different signal wavelengths to J different receivers 22. Also, tunable transmitters 20 and receivers 22 can be employed in the optical nodes 12 in a network, such as in FIG. 1. Tunable transmitters 20 and receivers 22 allow system operators and network architects to change the signal wavelengths being transmitted and received in the system 10 to meet their network requirements.

Figure 2:
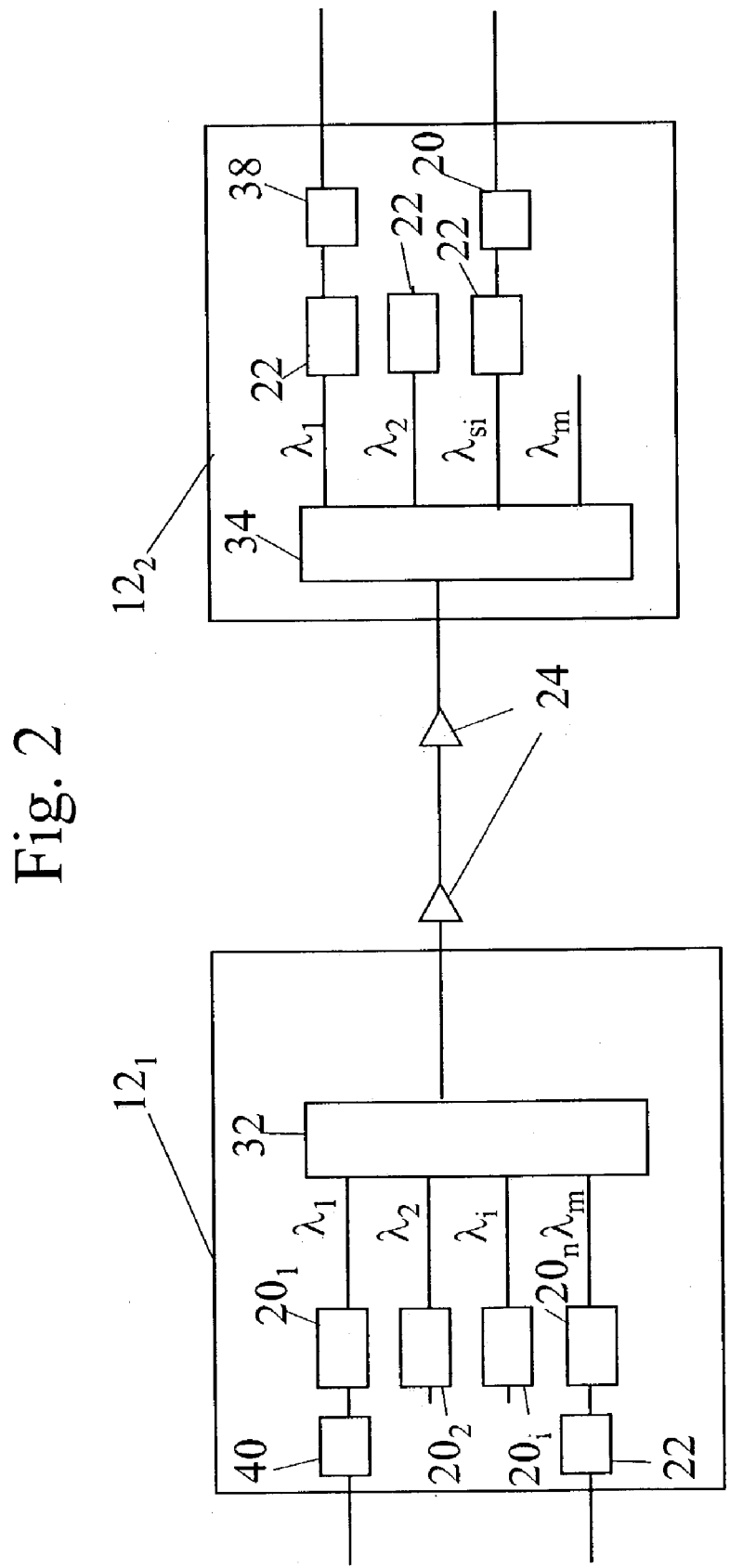

In addition, the transmitters 20 and receivers 22 can include various components to perform other signal processing, such as reshaping, retiming, error correction, differential encoding, protocol processing, etc. For example, receivers 22 can be connected to the transmitters 20 in back to back configuration as a transponder or regenerator, as shown in FIG. 2. The regenerator can be deployed as a 1R, 2R, or 3R regenerator, depending upon whether it serves as a repeater (repeat), a remodulator (reshape & repeat), or a full regenerator (reshape, retime, repeat).

In a WDM system, the transmitters 20 and receivers 22 can be operated in a uniform manner or the transmission and reception characteristics of the signal channels can be tailored individually and/or in groups. For example, pre-emphasis, optical and/or electrical pre-and post-dispersion and distortion compensation can be performed on each channel or groups of channels.

In FIG. 2, it will be appreciated that the transmitters 20 and receivers 22 can be used in WDM and single channel systems, as well as to provide short, intermediate, and/or long reach optical interfaces between other network equipment and systems. For example, transmitters 20 and receivers 22 deployed in a WDM system can be included on a module that includes standardized interface receivers and transmitters, respectively. The use of standardized interfaces supports interoperability with interfacial devices 30 and other transmission and processing systems.

The optical amplifiers 24 can be deployed periodically along optical links 15 to overcome attenuation that occurs in a span of transmission media 16. In addition, optical amplifiers 24 can be provided proximate to other optical components, for example, at the node 12 as booster and/or pre-amplifiers to provide gain to overcome component losses. The optical amplifiers 24 can include doped (e.g. Er, other rare earth elements, etc.) and non-linear interaction (e.g., Raman, Brillouin, etc.) fiber amplifiers that can be pumped locally and/or remotely with optical energy in various configurations.

For example, optical fiber amplifier 24 generally include an amplifying fiber supplied with power in the form of optical, or "pump", energy from one or more pump sources. The amplifying fiber can have the same or different transmission and amplification characteristics than the transmission fiber. Thus, the amplifying fiber can serve multiple purposes in the optical system, such as performing dispersion compensation, as well as different levels of amplification of the signal wavelengths $\lambda_i$. The pump source can include one or more narrow band or broad band optical sources, each providing optical power in one or more pump wavelength ranges designated by center pump wavelengths $\lambda_{pi}$ and including one or more spatial and/or longitudinal modes. Pump energy can be supplied to the amplifying fiber, either counter-propagating and/or co-propagating with respect to the propagation of the signal wavelengths $\lambda_{si}$.

Other types of optical amplifiers, such as semiconductor amplifiers, can be used in lieu of, or in combination with the fiber amplifiers. The optical amplifiers 24 can include one or more serial and/or parallel stages that provide localized gain at discrete sites in the network and/or gain that is distributed along the transmission media 16. Different amplifier types can be included in each stage and additional stages to perform one or more other functions. For example, optical regeneration, dispersion compensation, isolation, filtering, add/drop, switching, etc. can be included at a site along with the optical amplifier 24.

Various types of integrated optical switching devices, both optical switches 26 and OADMs 28, can be integrated into the nodes 12 and the all-optical networking functionality of the devices can be used to establish distance independent networks. The integrated switching devices allow for integrated optical transport switching, adding, dropping, and/or termination of signal channels from multiple paths 14 entirely in the optical domain. The switching device eliminate the need for receivers 22 and transmitters 20 to perform electrical conversions, as required when using interfacial devices 30, merely to pass the information through intermediate nodes 12$_i$. As such, signal channels can optically pass through intermediate nodes 12$_i$ between the origin nodes 12$_o$ and destination nodes 12$_d$ channels, bypassing the need for transmitters 20 and receivers 22 at the intermediate nodes 12$_i$. In this manner, the switching devices provide transparency through the node that allows all-optical express connections to be established between non-adjacent origin and destination nodes in a network.

The signal channels optically passing through the integrated switching devices can be distributed from a common path to multiple diverse paths, as well as combined from multiple diverse paths onto a common path. It will be appreciated that signal channels that are switched by the integrated switching devices onto a common path from different paths can have different properties, such as optical signal to noise ratio. Conversely, signal channels entering the switching devices from a common path and exiting the devices via different paths may require that the signal channels exit with different properties, such as power level. As such, signal channels may have different span loss/gain requirements or tolerances within the link 15.

The integrated optical switches 26 and OADMs 28 can be configured to process individual signal channels or signal channel groups including one or more signal channels. The switching devices also can include various wavelength selective or non-selective switch elements, combiners 32, and distributors 34. The transmitters 20 and receivers 22 can be configured to transmit and receive signal channels dynamically through the switch elements or in a dedicated manner exclusive of the switch elements using various combiners 32 and distributors 34. The OADMs can include wavelength reusable and non-reusable configurations. Similarly, the switching devices can be configured to provide multi-cast capability, as well as signal channel terminations.

The switching devices can include various configurations of optical combiners 32 and distributors 34, such as multiplexers, demultiplexers, splitters, and couplers further described below, in combination with various switch elements configured to pass or block the signals destined for the various other nodes 12 in a selective manner. The switching of the signals can be performed at varying granularities, such as line, group, and channel switching, depending upon the degree of control desired in the system 10.

The switch element can include wavelength selective or non-selective on/off gate switch elements, as well as variable optical attenuators having suitable extinction ratios. The switch elements can include single and/or multiple path elements that use various techniques, such as polarization control, interferometry, holography, etc. to perform the switching and/or variable attenuation function. The switching devices can be configured to perform various other functions, such as filtering, power equalization, dispersion compensation, telemetry, channel identification, etc., in the system 10.

Various one, two, and three dimensional non-selective switch elements can be used in present invention, such as mechanical line, micro-mirror and other micro-electro-mechanical systems ("MEMS"), liquid crystal, holographic, bubble, magneto-optic, thermo-optic, acousto-optic, electro-optic ($LiNbO_3$), semiconductor, erbium doped fiber, etc. Alternatively, the switch elements can employ fixed and tunable wavelength selective multi-port devices and filters, such as those described below. Exemplary switching devices are described in PCT Application No. PCT/US00/23051, which is incorporated herein by reference.

The interfacial devices 30 generally provide dedicated switching and/or signal processing at various points in the system 10. The interfacial devices 30 may include, for example, protocol and bit rate independent devices, such as dedicated optical switches and/or protocol and bit rate dependent electrical switch devices, such as IP routers, ATM switches, SONET add/drop multiplexers, etc. The interfacial devices 30 can be configured to receive, convert, and provide information in one or more various protocols, encoding schemes, and bit rates to one or more transmitters 20, and perform the converse function for the receivers 22. The interfacial devices 30 also can be used as an input/output cross-connect switch or automated patch panel and to provide protection switching in various nodes 12 depending upon the configuration. The interfacial devices 30 can be electrically connected to the transmitters 20 and receivers 22 or optically connected using standard interface and/or WDM transmitters and receivers, as previously described.

Optical combiners 32 can be provided to combine optical signals from multiple paths into a WDM signal on a common path, e.g. fiber, such as from multiple transmitters 20 or in optical switching devices. Likewise, optical distributors 34 can be provided to distribute one or more optical signals from a common path to a plurality of different optical paths, such as to multiple receivers 22 and/or optical switching devices.

The optical combiners 32 and distributors 34 can include wavelength selective and non-selective ("passive") fiber, planar, and free space devices, as well as polarization sensitive devices. For example, one or more multi-port devices, such as passive, WDM, and polarization couplers/splitters having various coupling/splitting ratios, circulators, dichroic devices, prisms, diffraction gratings, arrayed waveguides, etc. can be employed used in the combiners 32 and distributors 34. The multi-port devices can be used alone, or in various combinations of filters, such tunable or fixed, high, low, or band pass or band stop, transmissive or reflective filters, such as Bragg gratings, Fabry-Perot, Mach-Zehnder, and dichroic filters, etc. Furthermore, one or more serial or parallel stages incorporating various multi-port device and filter combinations can be used in the combiners 32 and distributors 34 to multiplex, demultiplex, and multicast signal wavelengths $\lambda_i$ in the optical systems 10.

Figure 3:
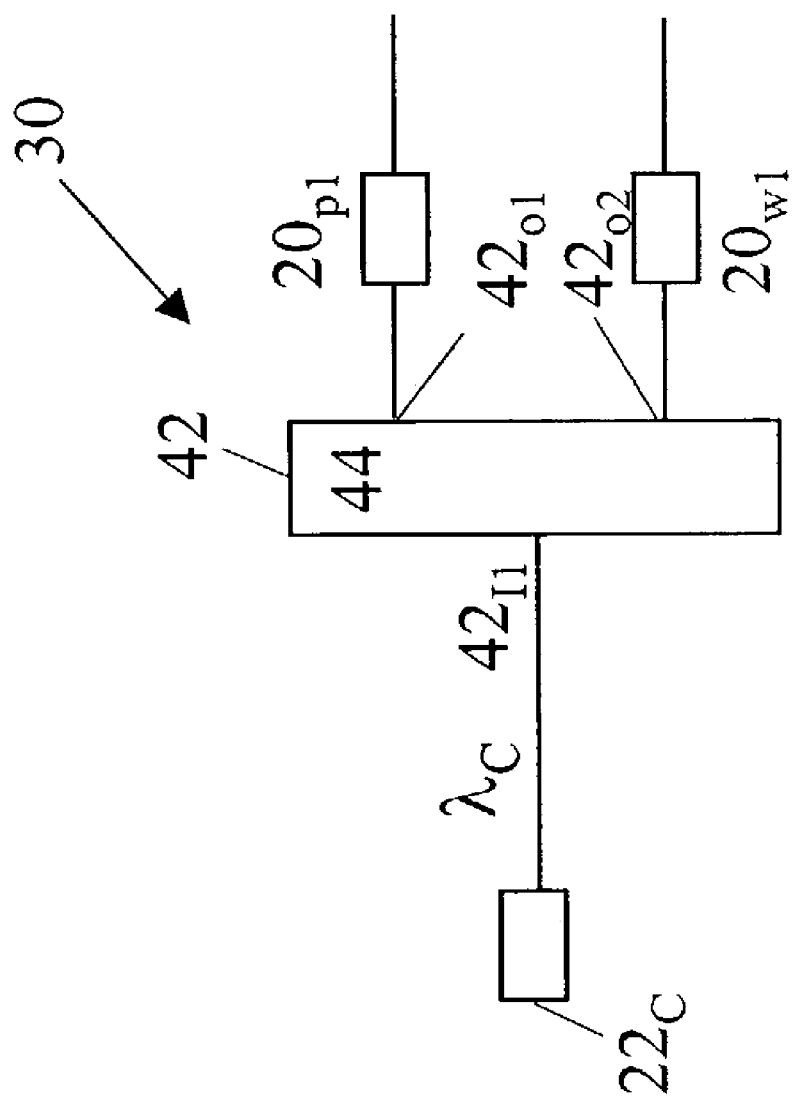
FIGS. 3–7*b* show optical switch embodiments.

As shown in FIG. 3, the system 10 includes at least one interfacial device 30, such as a dedicated optical switch 42. The optical switch 42 is configured to provide protection for an input, or client, optical signal being provided to the network. The optical switch 42 will be described herein as generally protecting the transmission of unprotected client optical signals provided to the system 10. However, it also can be used to provide optical layer protection for protected client signals provided to the system 10.

The optical switch 42 generally includes one or more input ports $42_i$ connected to one or more output ports $42_o$ via a switch fabric 44. The switch fabric can include one or more types of switch elements in various configurations. The number of the input ports $42_i$ and the output ports $42_o$ and the connectivity between the input ports $42_i$ and the output ports $42_o$ will depend upon the desired functionality in the optical switch 42.

FIG. 3 shows an embodiment in which an input, or client, optical signal $\lambda_c$ from a transmitter 20 is provided to a first switch input port $42_{I1}$ of the optical switch 42. The client signal can be from a single channel, or space division multiplexed ("SDM"), transmission system or interface, or from a wavelength division multiplexed ("WDM") system. If the client signal is from a WDM system, it will be appreciated that the client signal can be separated from other signals in the WDM signal via bulk demultiplexing or filtering prior to reception or coherently received and separated.

The optical switch 42 is configured to provide the client signal $\lambda_c$ to each of first and second switch output ports, $42_{O1}$ and $42_{O2}$, respectively, when an optical switch fabric 44 in the switch 42 is in a first state and to only one of the first and second switch output ports, $42_{O1}$ and $42_{O2}$, respectively, when an optical switch fabric 44 in the switch 42 is in a second state.

Figure 4:
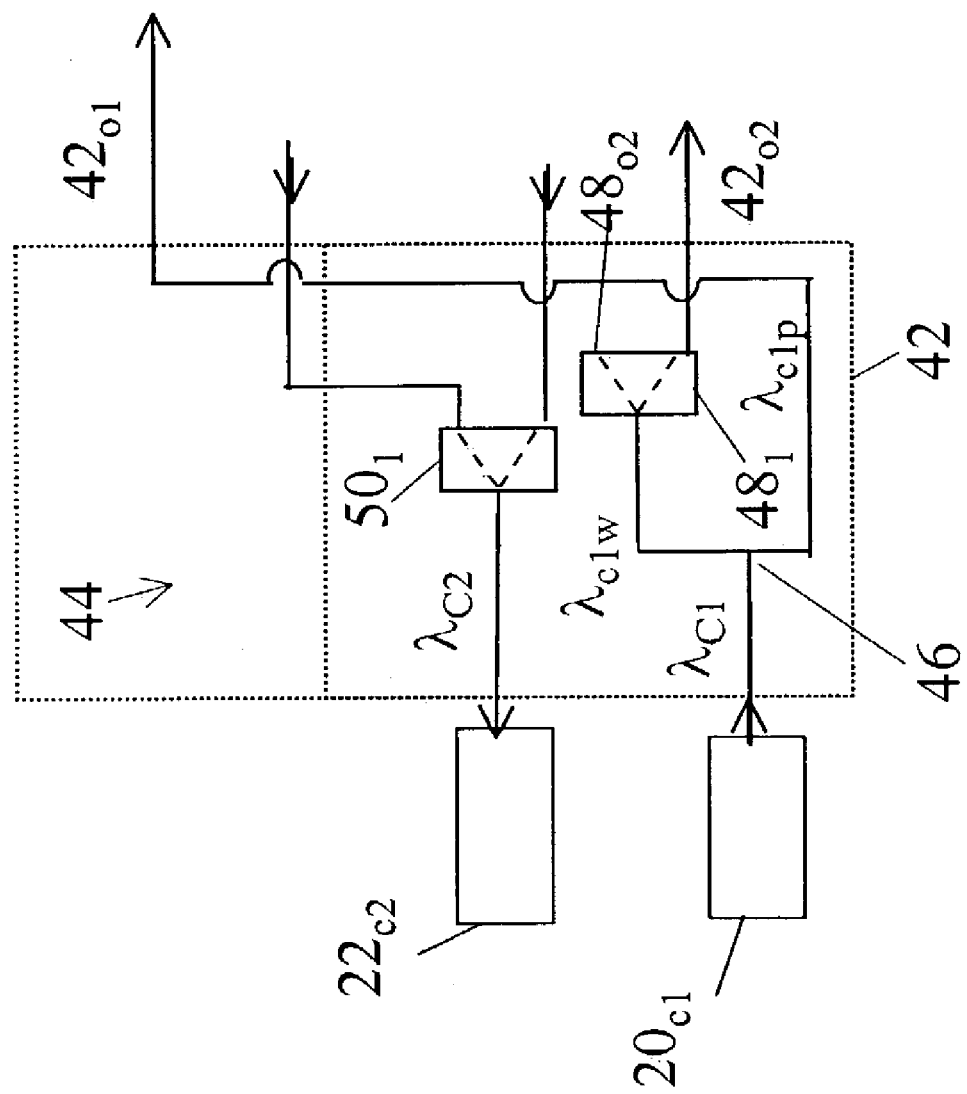

FIG. 4 shows an exemplary embodiment of the optical switch 42 having the switch fabric 44 configured to provide the general functionality described with reference to FIG. 3. The switch fabric 44 includes an optical splitter 46, such as a 1×2 (3 dB) splitter, which splits the client signal one $_{\lambda c1}$ into at least two replicate first client signals: a working signal, or channel, one $\lambda_{c1w}$ and a first protection signal, or channel, one $\lambda_{c1p}$. Generally, the number of input and output ports of the splitter can be kept to a minimum, i.e., 1×2, to minimize the amount of optical loss. It will be appreciated that higher port counts can be used, for example, to allow the switch fabric 44 to be expanded.

One of the splitter output ports is in optical communication with and provides the working signal one $_{\lambda c1w}$ to an input port of a first transmitter switch $48_1$. The splitter output port carrying the first protection signal one $_{\lambda c1p}$ is in optical communication with the first switch output port $42_{O1}$.

In a first state, the first transmitter switch $48_1$ enables optical communication between the input port of the switch $48_1$ and a first output port of the switch $48_1$, which is in further optical communication with the second switch output port $42_{O2}$. In a second state, the first transmitter switch $48_1$ enables optical communication between the input port of the switch $48_1$ and a second output port of the switch $48_1$, which is not in further optical communication with the second switch output port $42_{O2}$.

As shown further in FIG. 4, the switch 42 can be configured to protect bi-directional traffic by the inclusion of a first receiver switch $50_1$ in the switch fabric 44. FIG. 4 embodiments provide a segregated switch fabric 44 employing independent transmitter switches 48 and receiver switches 50. It will be appreciated that segregated and/or integrated switch fabrics 44 can be used to provide a desired functionality in the optical switch 42.

Receiver switches 50 can employ the same or a different switch element technology than the transmitter switches 48. As such, the previous discussion of the transmitter switches 48 also is applicable to the receiver switches 50. In practice, it may be desirable to deploy the same switch element technology for all transmitter switches 48 and receiver switches 50 to minimize the complexity of any control schemes and software associated with the optical switch fabric 44.

Figure 5:
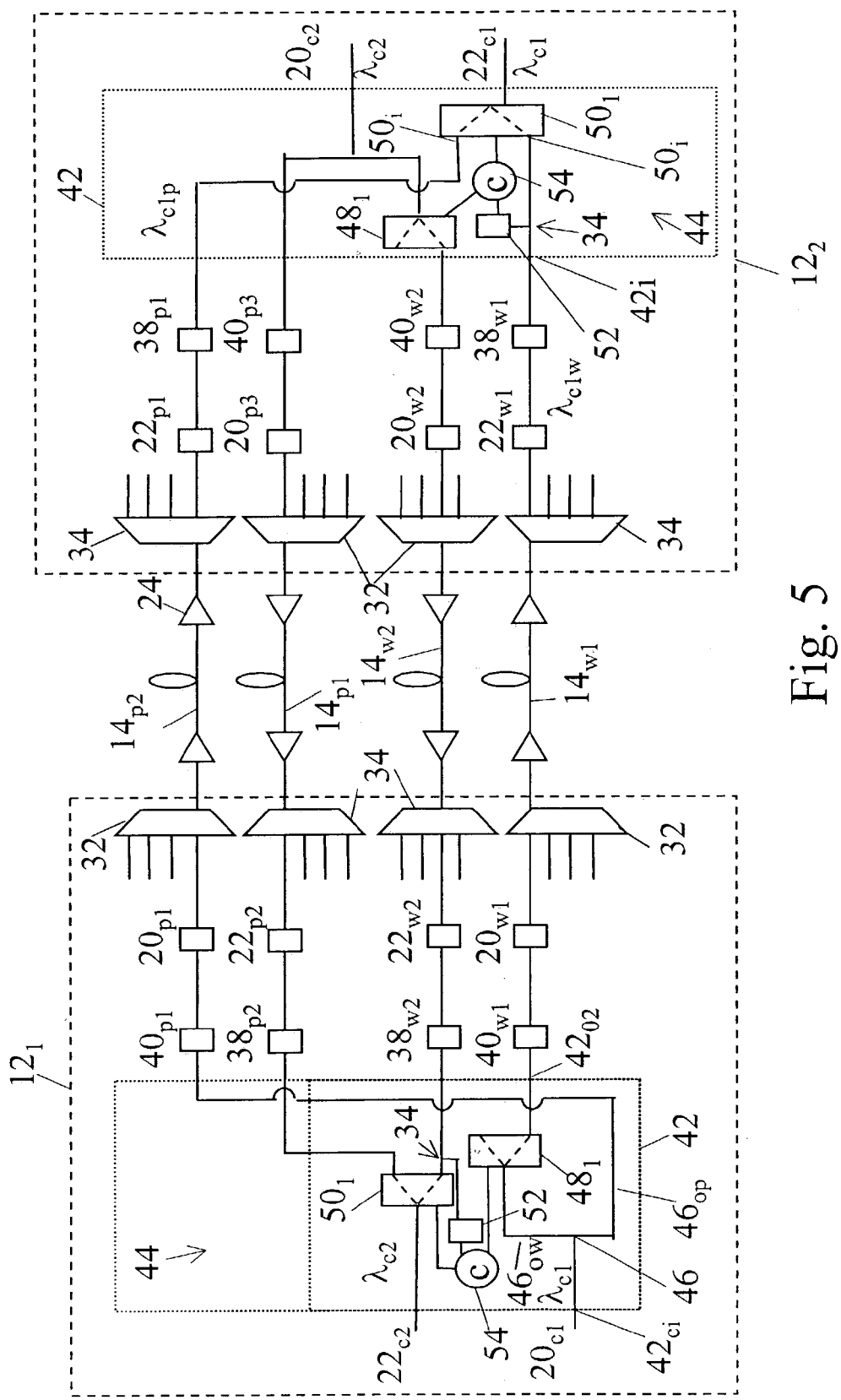

FIG. 5 shows a bi-directional system 10, in which client signal one $_{\lambda c1}$ is sent from the client transmitter $20_{c1}$ to one of the client inputs $42_{ci}$ of the switch 42. Client signal one $_{\lambda c1}$ is split by splitter 46 and sent along respective working and protection splitter output ports $46_{ow}$ and $46_{op}$, respectively. The working signal one $_{\lambda c1}$ enters the input to the first transmitter switch $48_1$.

In a first state, the switch $48_1$ passes the working signal one $_{\lambda c1}$ to the output port $42_{o2}$ of the switch 42. The working signal one $_{\lambda c1}$ is received by the interface receiver $40_{w1}$, which receives the signal and provides it to the signal one working transmitter $20_{w1}$. The working signal one is transmitted along working path $14_{w1}$ to the working signal one receiver $22_{w1}$, which typically will reside at another node, e.g., $12_2$. The working signal one is then passed from the working signal one receiver $22_{w1}$ to the interface transmitter $38_{w1}$. Client signal one $_{\lambda c1w}$ is transmitted through one of the input ports $42_i$ of another switch $42_2$ to one of the input ports $50_i$ of the first receiver switch $50_i$. When the first receiver switch $50_1$ is in a first state, client signal one $_{\lambda c1w}$ will be passed to the client signal one receiver $22_{c1}$.

Similarly, the protection client signal one $_{\lambda c1p}$ is provided to the interface receiver $40_{p1}$, which receives the signal and provides it to the signal one protection transmitter $20_{p1}$. The protection signal one is transmitted along protection path $14_{p1}$ to the signal one protection receiver $22_{p1}$. The protection signal one is then passed from the signal one protection receiver $22_{p1}$ through one of the input ports $42_i$ of another switch $42_2$ and to a second of the input ports $50_i$ of the first receiver switch $50_1$. When the first receiver switch $50_1$ is in a second state, protection signal one $_{\lambda c1p}$ is passed to the client signal one receiver $22_{c1}$ and working signal one $_{\lambda c1w}$ is blocked from reaching the client signal one receiver $22_{c1}$ by the first receiver switch $50_1$.

While not explicitly shown, the first transmitter switch $48_1$ can be placed in a second state, which can be used for various purposes. For example, the working client signal can be provided to various shared path and equipment protection switch modules, such as those that will be further described, as well as for signaling or testing.

Transmission of client signal two $_{\lambda c2}$ via working and protection paths $14_{w2}$ and $14_{p2}$, as well as other client signals, can occur analogous to the above description of the client signal one $_{\lambda c1}$. While the embodiment shown in FIG. 5 provides for 1+1 protection of the client signals, it will be appreciated that 1+N protection can be provided with appropriate modification. In addition, while the present invention is described with respect to transmitting signal uni-directionally on the fiber, the invention is applicable to bi-directional signal transmission through the fiber if the signal is separated into unidirectional components before reaching the splitter 46.

In various embodiments, as shown further in FIG. 5, a signal monitor 52 can be provided in the switch 42. The signal monitor 52 monitors the working client signal transmitted from the interface transmitter 38 to the input port $50_i$. The signal monitor 52 is used to tap off a portion of the client signal to monitor the presence or absence of the client signal. The signal monitor 52 can include various embodiments of optical distributors 34 and optical to electrical converters, such as a low ratio tap splitter and a monitoring photodiode.

The signal monitor 52 can provide a monitoring signal to a controller 54 indicative of the presence, absence, or condition of the client signal sent by the interface transmitter 38. The controller 54 can be a microprocessor, microcontroller, or some other controller that typically would be resident within the switch 42, but can be located externally to the switch 42.

The controller 54 can be configured to switch the first receiver switch $50_1$ between the first state and the second state depending upon the monitoring signal. For example, when the monitoring signal indicates the absence of the client signal, known as a loss of signal ("LOS") condition, the controller 54 can switch the switch $50_1$ to the second state to pass the protection client signal to the client receiver $22_c$. The LOS condition and protection switching also can be triggered by other alarm conditions in the system, such SONET or FEC errors, loss of frame, loss of synchronization, etc. The controller 54 also can be configured to allow automatic or manual, revertive and non-revertive switching of the switch $50_1$ back to the first state, when the signal monitor detects the presence of the signal. Various embodiments can be employed, such as those described in U.S. patent application Ser. No. 09/578,089 dated May 24, 2000, which is incorporated herein by reference.

In addition, the controller 54 can be configured to control the first transmitter switch $48_1$ to provide bi-directional protection switching. For example, when a LOS condition is identified by the controller 54 in the first switch $42_1$, it can switch the first transmitter switch $48_1$ to the second state. The switching prevents the client signal from being propagated through the working path $14_w$ triggering a LOS condition detected by the controller 54 located in the second node $12_2$. The controller 54 triggers a protection switch of the first receiver switch $50_1$ in the second node $12_2$ to the second state, which pass the protection signal to the client signal receiver.

In addition, the second state of the first transmitter switch $48_1$ can be used to signal other devices that a protection switch has occurred, by transmitting the protected signal to a fiber connected to the second state of switch $48_1$. Such devices may be collocated with switch fabric 44, either integrated into it or in a separate device, or located in another site. It will be appreciated that, at a site, a number of fibers may be attached to instances of switch fabric 44, and the second state of first transmitter switch $48_1$ of each instance may be used to signal to another device or another site the identity of the fiber or fibers affected by a LOS, and to configure such other devices for subsequent switching.

It will be appreciated that signal monitors 52 and controllers 54 generally can be used to monitor the signal entering and/or exiting the transmitter switches 48 and/or receiver switches 50. The signal monitors 52 and controllers 54 can be used to ensure proper performance, provide redundancy and stage the various switching operations depending upon the specific protection and restoration schemes being implemented.

The switch fabric 44 can include various switch element combinations and configurations to provide different levels of redundancy and protection and restoration schemes. The particular protection scheme employed in the system will depend upon the type of traffic passing through the network. For example, it may be desirable to provide unprotected or shared protection for some traffic, while other traffic requires dedicated protection, such as may be the case with IP and voice traffic.

In the present invention, the protection is shared between nodes 12, which provides a protection net for the nodes as will be described with respect to FIG. 10 hereinafter. The protection net can be the sole protection employed or it can be employed with protection schemes that operate within the node 12.

FIGS. 6 & 7 show embodiments of optical switches 42 having distinct, cooperating dedicated and shared protection sections, $42_d$ and $42_s$, respectively. In addition, it will be appreciated that other interfacial devices 30, such as an electrical cross-connect or ATM switches or IP routers can be used in combination with the embodiments of FIGS. 6 & 7.

Figure 6A:
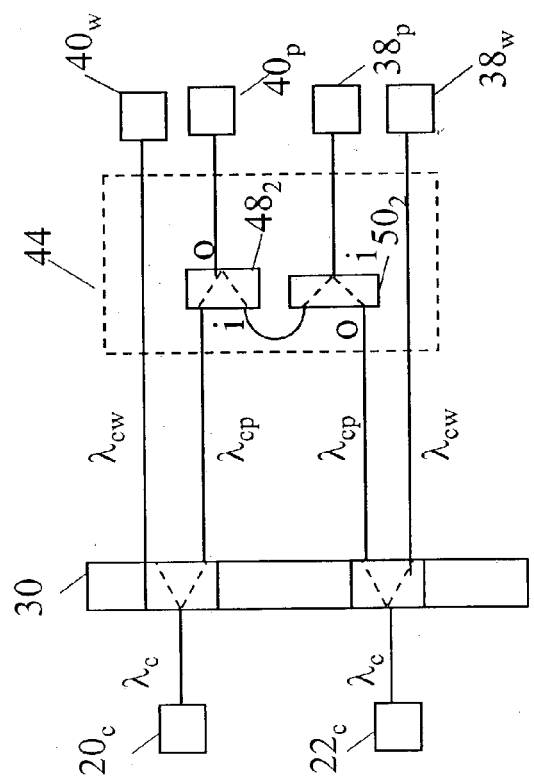

In FIG. 6a embodiments, the switch fabric 44 includes a second receiver switch $50_2$ having an input port in optical communication with the protection interface transmitter $38_p$. The second receiver switch $50_2$ also has one output port in optical communication with an input port of the second transmitter switch $48_2$ and a second output port in optical communication with the client signal receiver $22_c$.

The second transmitter switch $48_2$ has another input port in optical communication with the client signal transmitter $20_c$ and an output port in optical communication with the protection interface receiver $40_p$.

The second transmitter switch $48_2$ and second receiver switch $50_2$ to be configured to provide optical communication between the protection interface transmitter $38_p$ and the protection interface receiver $40_p$. Thus, protection client signals originating and destined for other nodes 12 in the system 10 can be passed through the switch fabric 44 using the protection transmitters and receivers within the node. The pass through capability enable multiple nodes to share protection capacity in the system 10, thereby increasing network utilization and reducing costs.

As shown in FIG. 6a and mentioned previously, client signals can be received from and transmitted to the switch 42 from other interfacial devices 30. For example, optical or electrical cross-connect switches, ATM switches, and/or IP routers can be used provide multiple paths into the system 10 for a single port client signal.

Figure 6B:
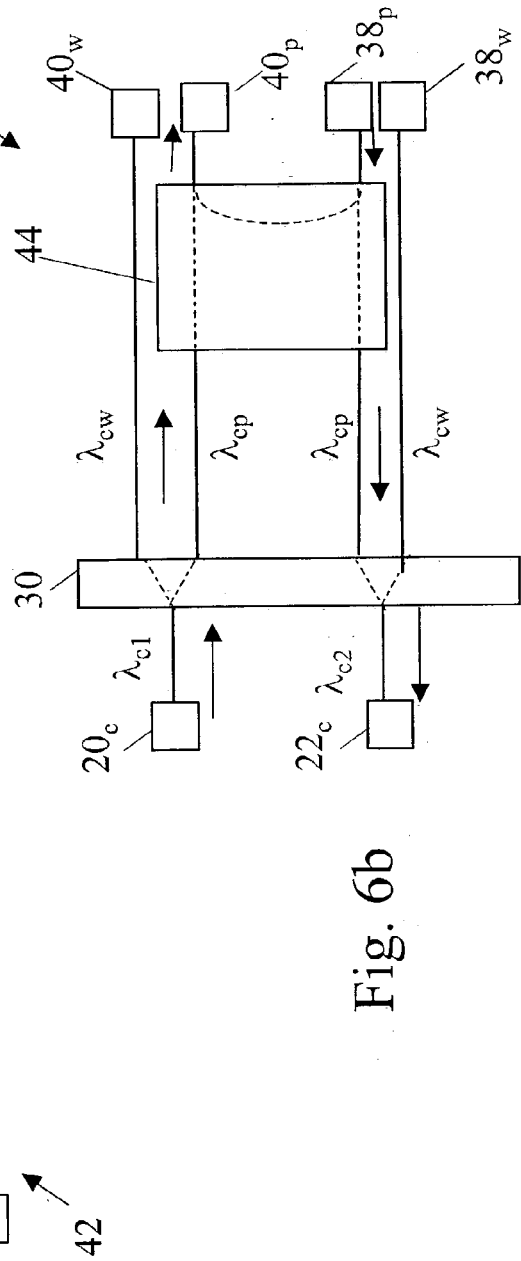

FIG. 6b shows another embodiment of the switch 42, in which an optical cross-connect, or cross-point switch, is used to provide an integrated switch fabric 44 to support shared protection. The optical cross-connect can have full or partial cross-connect functionality depending upon the desired application.

The switch fabric 44 is used to connect a protection client signal from a first client transmitter $20_1$ or a second protection interface transmitter $38_{p2}$ or no signal at all to the first interface receiver $40_{p1}$. Likewise, the switch fabric 44 is used to connect a protection signal from the second protection interface transmitter $38_{p2}$ to the second client receiver $22_1$, the first interface receiver $40_{p1}$, or to prevent the passage of the protection signal through the switch fabric 44.

Figure 6C:
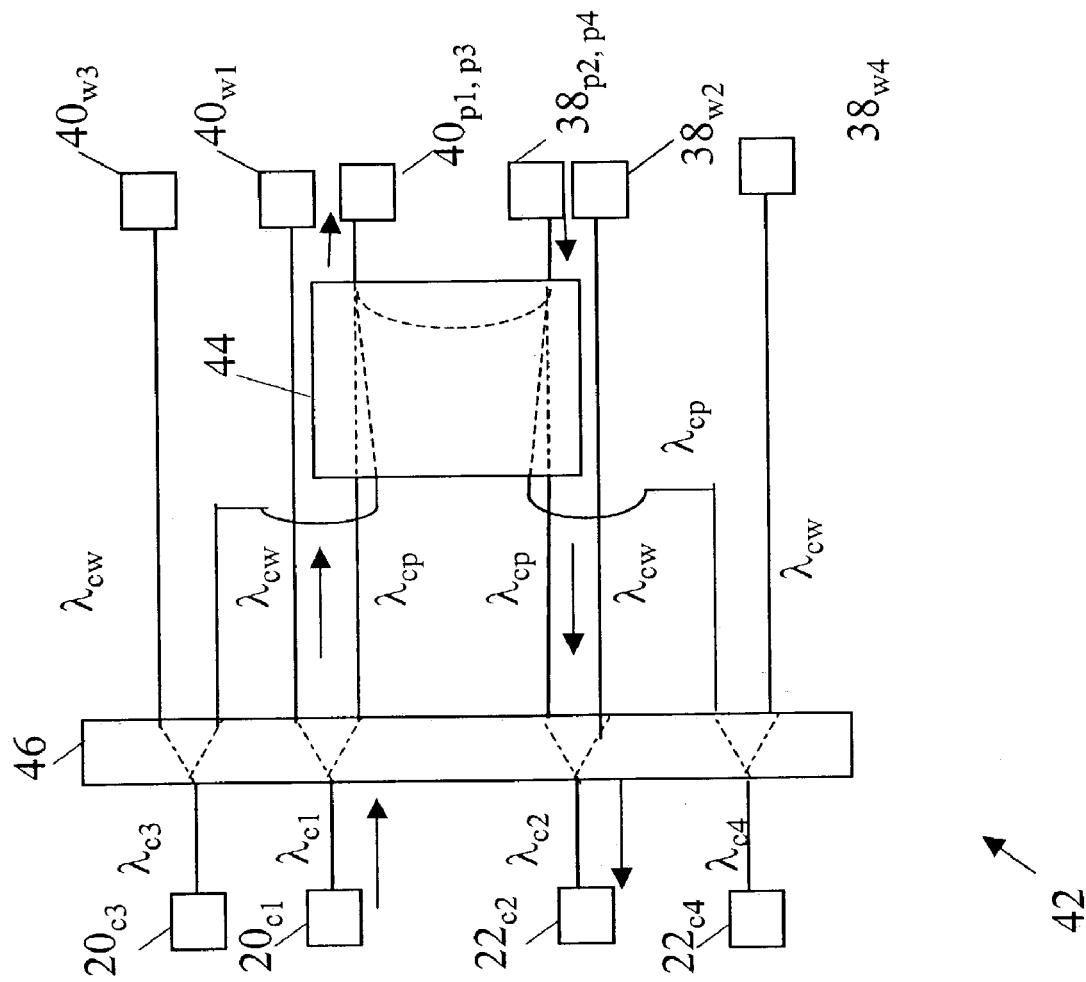
Figure 6D:
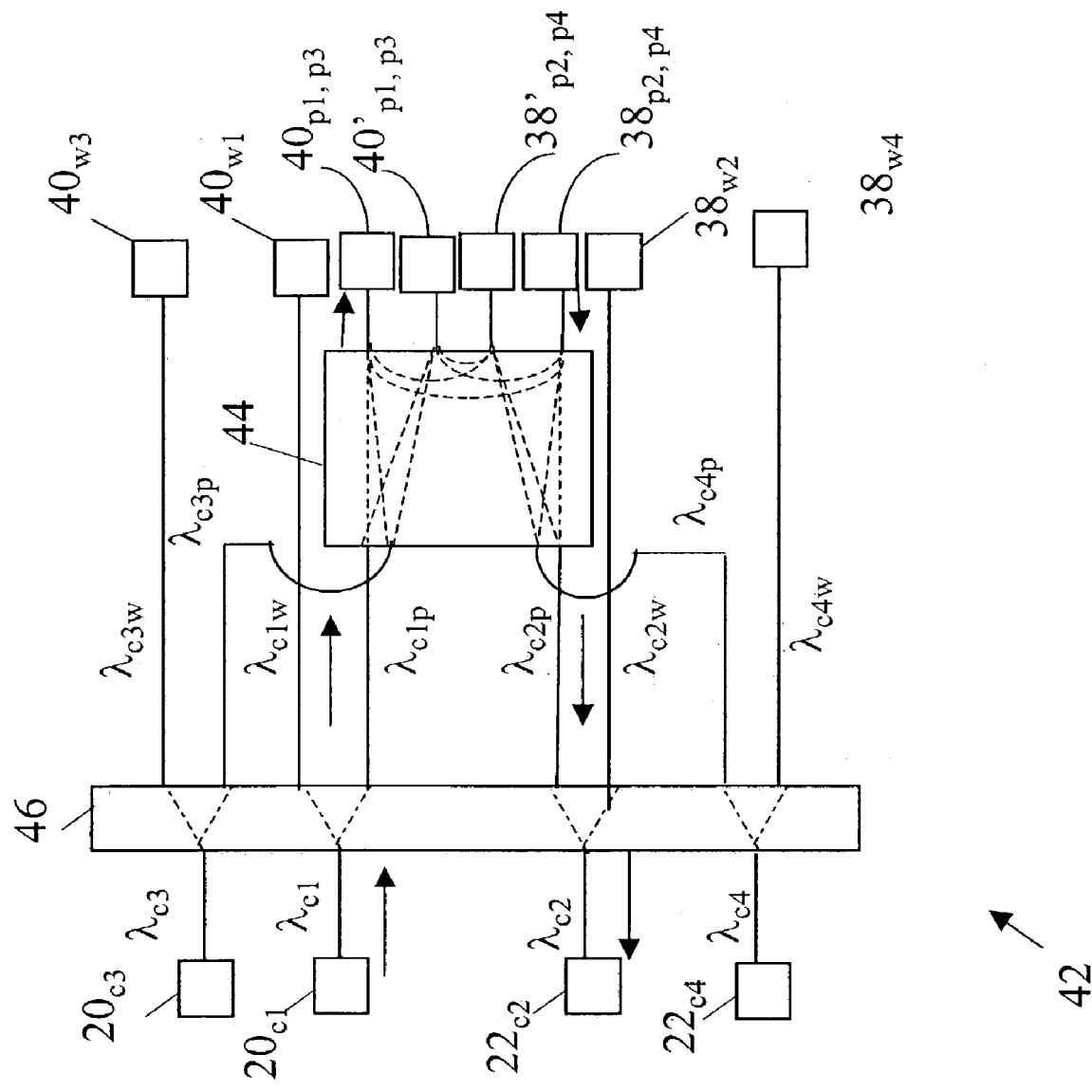

FIGS. 6c & 6d show embodiments of the switch 42 in which one or more client signals originating or destine for a node can be protected via one or more protection channels, in addition to providing pass through protection for traffic passing between other nodes. FIG. 6c shows multiple client signals being protected by a single protection channel. Whereas, FIG. 6d shows multiple protection channels being available to protect one or more client signals.

Figure 7A:
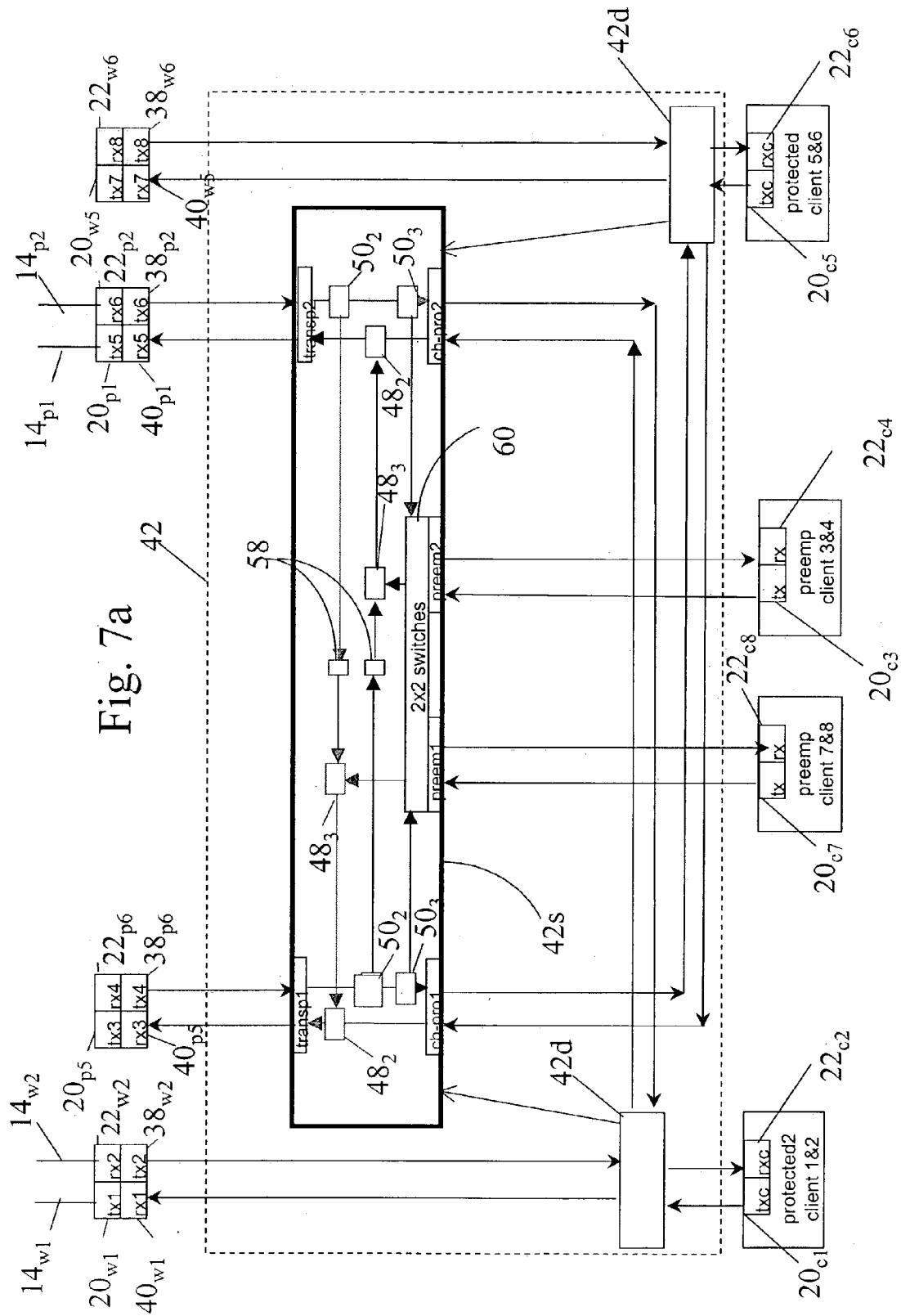
Figure 7B:
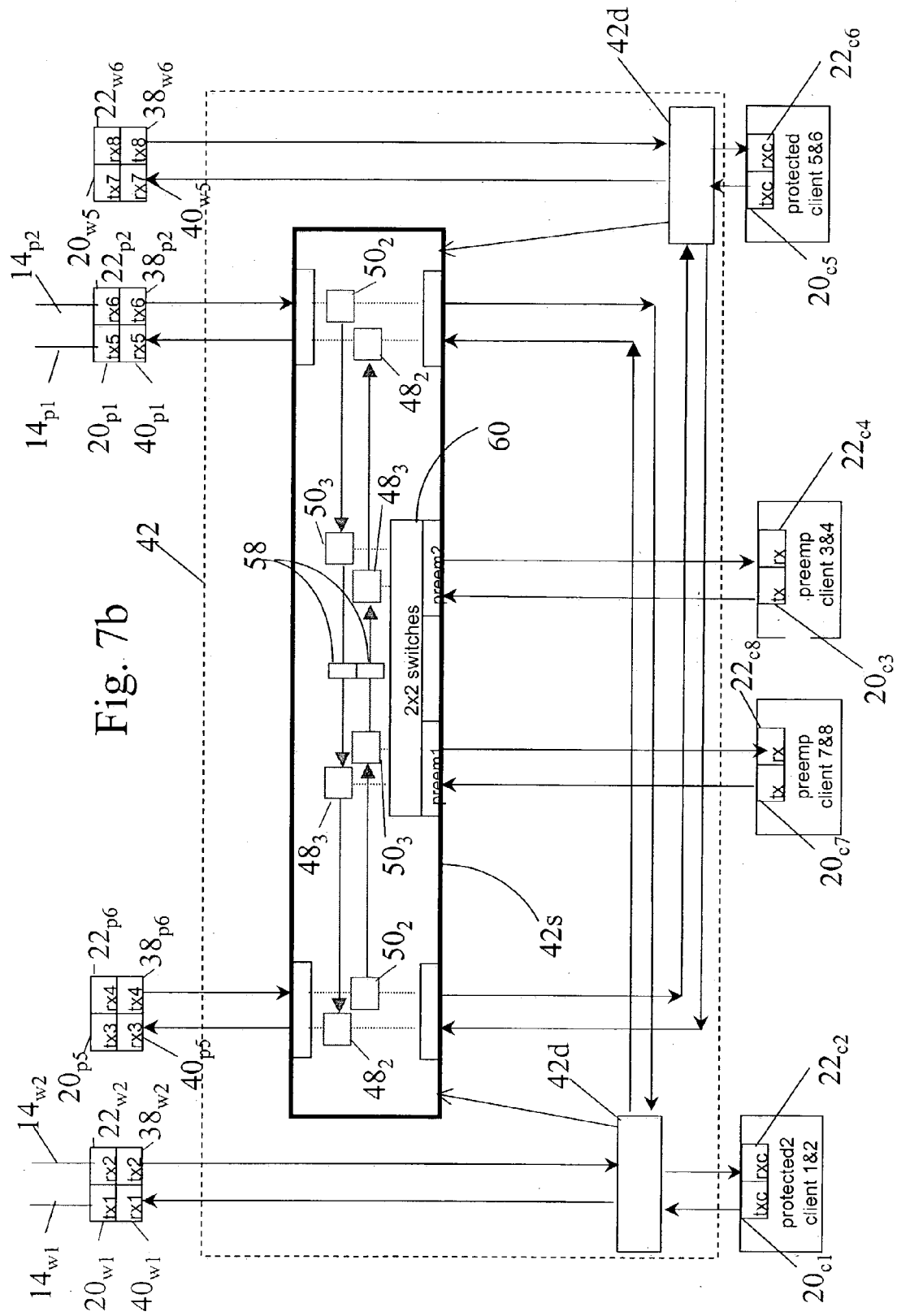

As shown in FIGS. 7a & 7b, the switch fabric 44 can be modified to provide the capability to insert preemptable traffic into the shared protection paths not currently in use. When the protection paths are needed, the preemptable traffic is preempted in favor of the protection traffic. The dedicated switching section $42_d$ can include various dedicated switching embodiments, such as those in FIGS. 4 and 5. It will be appreciated that FIGS. 7a–7b show exemplary switch fabric 44 for use in the shared switching section that provide comparable functionality.

As shown in FIGS. 7a–7b, preemptable client signals three, four, seven, and eight can be transmitted and received, respectively, at nodes 12 that include the switch fabric 44. Preemptable transmitters $20_{c3}$ and $20_{c7}$ and receivers $22_{c4}$ and $22_{c8}$ can be provided in optical communication with the switch fabric 44 to allow insertion of preemptable signal along the protection paths.

In FIG. 7a embodiments, similar to FIG. 6, the second receiver switch $50_2$ having an input port in optical communication with the protection interface transmitters $38_{p2}$ or $38_{p6}$. The second output port of the second receiver switch $50_2$ is in optical communication with an input port to a third receiver switch $50_3$. The third receiver switch $50_3$ has a first output port that can be placed in optical communication with client signal receivers $22_{c2}$ and $22_{c6}$ and a second output port in optical communication with preemptable client signal receivers $22_{c4}$ and $22_{c8}$.

The second receiver switch $50_2$ also has at least one output port in optical communication with an input port of a third transmitter switch $48_3$. The third transmitter switch $48_3$ has a second input in optical communication with preemptable client signal transmitters $20_{c3}$ and $20_{c7}$.

The third transmitter switch $48_3$ has an output in optical communication with a second input of the second transmitter switch $48_2$. Similar to FIG. 6 embodiments, the second transmitter switch $48_2$ has a first input port that can be place in optical communication with the client signal transmitters $20_{c1}$ and $20_{c5}$ and an output in optical communication with the protection interface receiver $40_{p1}$ and $40_{p5}$.

In FIG. 7a embodiments, the preemptable client signal three (or seven, by changing the state of switch 60) can be transmitted using the protection path $14_1$ for client signal one. The second and third transmitter switches $48_2$ and $48_3$, respectively, are configured to pass client signal three from the preemptable transmitter $20_{c3}$ to the client signal one interface receiver $40_{p1}$. If the protection path $14_{p1}$ is needed by a protection demand requiring the switch fabric 44 to loop, or tandem, the protected signal from the second interface transmitter $38_{p2}$ to the first interface receiver $40_{p1}$, then the second receiver switch $50_2$ switches from providing the output signal to the third receiver switch $50_3$ to the third transmitter switch $48_3$ via a tandem switch 58, which will be described later.

Similarly, if the protection path $14_{p1}$ is needed to protect client signal one, then the second transmitter switch $48_2$ switches to provide client one signal to interface receiver $40_1$. The protection signal preempts the output of the third transmitter switch $48_3$ from being passed to the protection interface receiver $40_{p1}$.

When the protection paths $14_{p1}$ and $14_{p2}$ are used to provide shared protection, it may be desirable to impose a hierarchy giving priority to protection client signals from various nodes 12. For example, the protection paths can be shared with the criteria that the first protection demand made on the shared protection path forecloses all other protection demands on that path. In that case, the second transmitter switch $48_2$ in FIG. 7a embodiments would be precluded from switching to provide client signal one to the client signal one protection interface receiver $40_{p1}$, if a prior protection demand had already been placed on the interface receiver $40_{pi}$. Analogously, a protection demand for client signal one would preempt client signal three from using interface receiver $40_1$, as well as other protection demands that would require the use of interface receiver $40_1$.

FIG. 7b shows a preemptable, shared protection switch fabric 44 similar to the FIG. 7a embodiments. In these embodiments, one output of the second receiver switch $50_2$ provides protection client signal two to the first receiver switch $50_1$ in a first state. In a second state, the second receiver switch $50_2$ provides either a tandem/loop protection signal or a preemptable signal to the input of the third receiver switch $50_3$. Likewise, the output ports of third receiver switch $50_3$ provide optical communication with input port to the third transmitter switch $48_3$ or the preemptable receiver $22_c$ directly or optionally via the cross-connect switch 60, such as a 2×2 optical switch. The cross-connect switches 60 provides additional flexibility by allowing preemptable traffic to be switched between protection paths passing through the node.

It will be appreciated that span switching may be supported by connecting a copy of the client signal to one of the preemptable receivers, coordinated with switching performed by switch 60. The copy of the client signal may be generated by switch fabric 44, or by another integrated or external device.

The tandem switch 58 can be used in various embodiments between the receiver switches 50 and the transmitter switches 48. The tandem switch 58 can be used to block signals being looped through the switch fabric 44 to facilitate the timing of various protection and restoration schemes, for example, when preemptable signal are present in the system.

Figure 8:
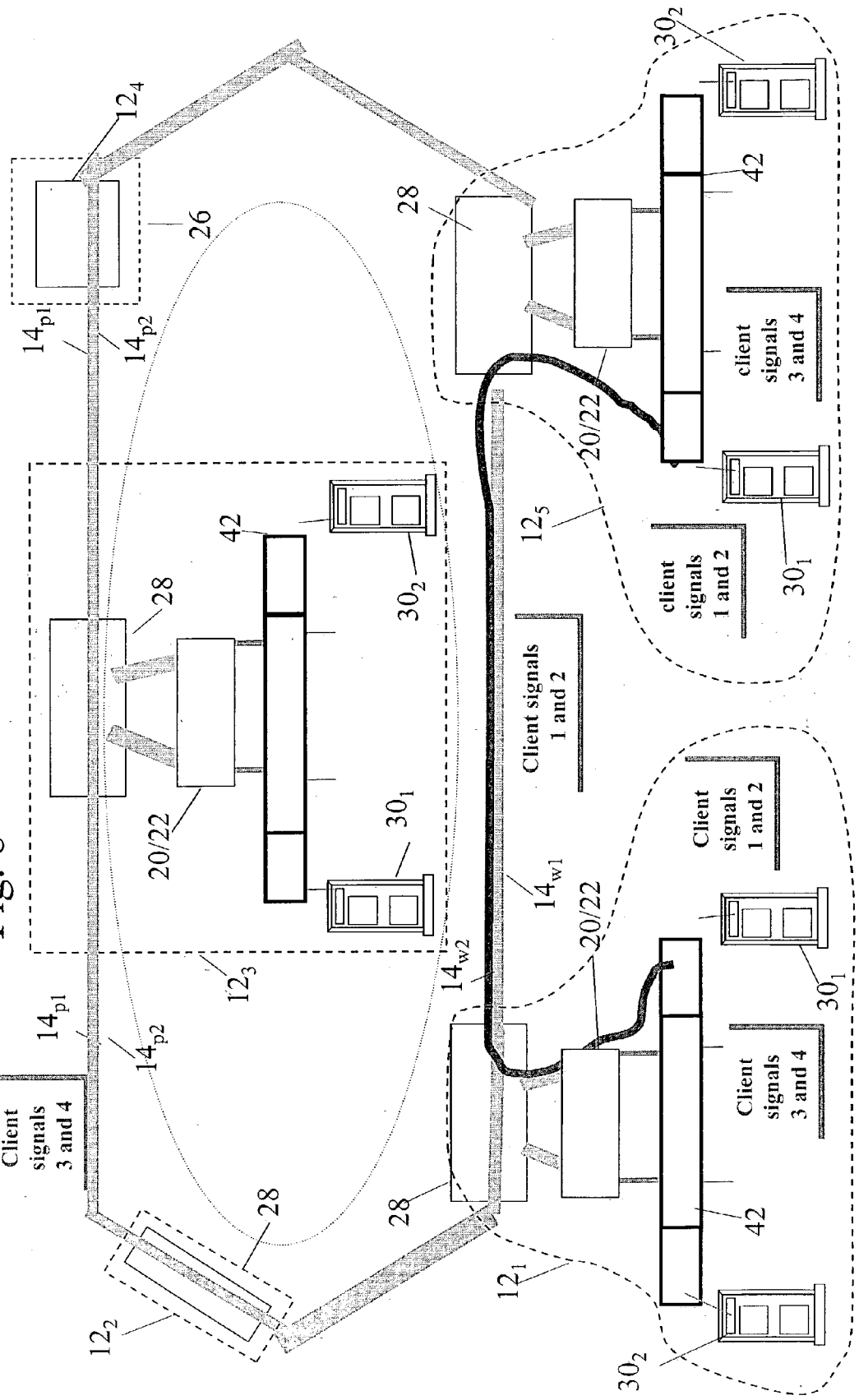
FIGS. 8–10*b* show optical system embodiments including optical switches.

FIG. 8 provides a high level view of the switches 42 deployed in a network connecting five nodes $12_1$–$12_5$ to provide shared protection amongst nodes $12_1$, $12_3$ and $12_5$. Client signal one and two demands are provided directly between nodes $12_1$ and $12_5$ using working paths $14_{w1}$ and $14_{w2}$, while protection paths $14_{p1}$ and $14_{p2}$ pass through nodes $12_{2-4}$. Preemptive client signals three and four demands can be sent from and received at node $12_1$ from either of nodes $12_3$ and $12_5$ using the protection paths $14_{p1}$ and $14_{p2}$.

In FIG. 8 embodiments, the switches 42 allow the protection paths to be used by any of the nodes 12 in the network to protect working paths. For example, client signal demands can be established by interfacial device $30_2$ in node $12_1$ and interfacial device $30_1$ in node $12_3$, which can be protected using a protection path passing though node $12_5$. Similarly, client signal demands can be established by interfacial device $30_2$ in node $12_5$ and interfacial device $30_2$ in node $12_3$, which can be protected using a protection path passing though node $12_1$.

Switching to protect any of the client signals using the protection path can be performed as described with respect to FIGS. 7a & 7b. Thus, if a node is the origin of a protection signal, the switch 42 will switch to provide the protection client signal from the client transmitter $20_c$ to the protection interface receiver $40_p$. If the node 12 is the destination of a protection signal, the switch 42 will switch to provide the protection client signal from the protection interface transmitter $38_p$ to the client receiver $22_c$. If the node 12 is neither the origin or the destination of the protection demand, then the switch 42 will switch to connect the protection interface transmitter 38 to protection interface receiver 40, thereby passing through, or looping, the protection signal through the switch back into the protection path.

Figure 9:
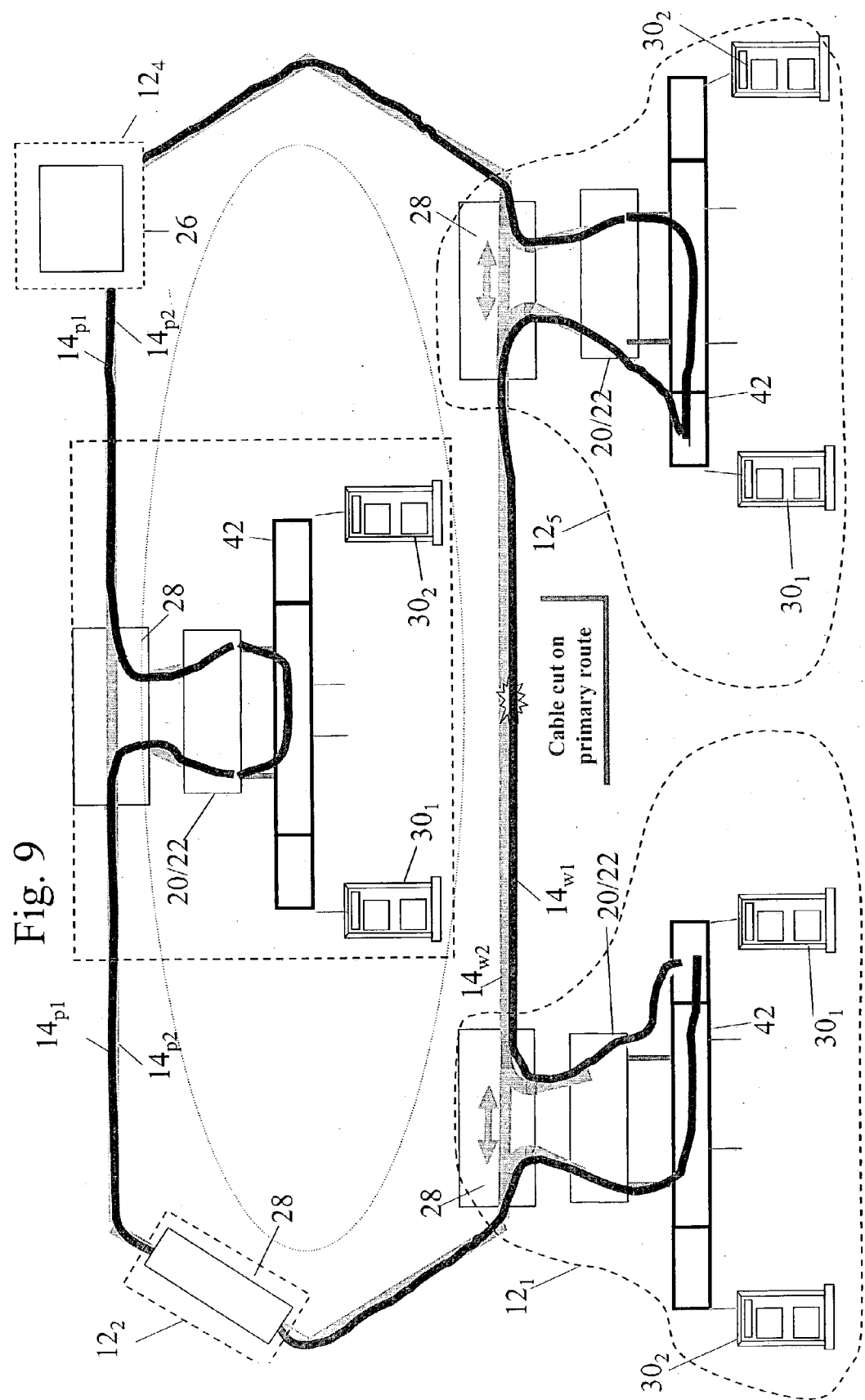

FIG. 9 depicts the above described scenario with respect to a failure, such as a fiber cut, along the working paths $14_{w1}$ and $14_{w2}$. Upon the detection of the failure, the switches in the origin and destination nodes $12_1$ and $12_5$ switch to transmit and receive client signals one and two using the protection path. At the same time, the presence of the protection signals at the switch $42_3$ triggers the switch to loop the client signals from the protection interface transmitter 38 to protection interface receiver 40.

In this manner, the switches 42 allow for the formation of a protection net, which provides protection bandwidth from a portion of the bandwidth of the network. Associated with the protection net is a set of working demands that are protected by the net. This set of demands thus forms a protection group. The protection net allows for multiple traffic demands, or working channels, to be protected with common protection channels, each with possibly more than one protection path.

Figure 10A:
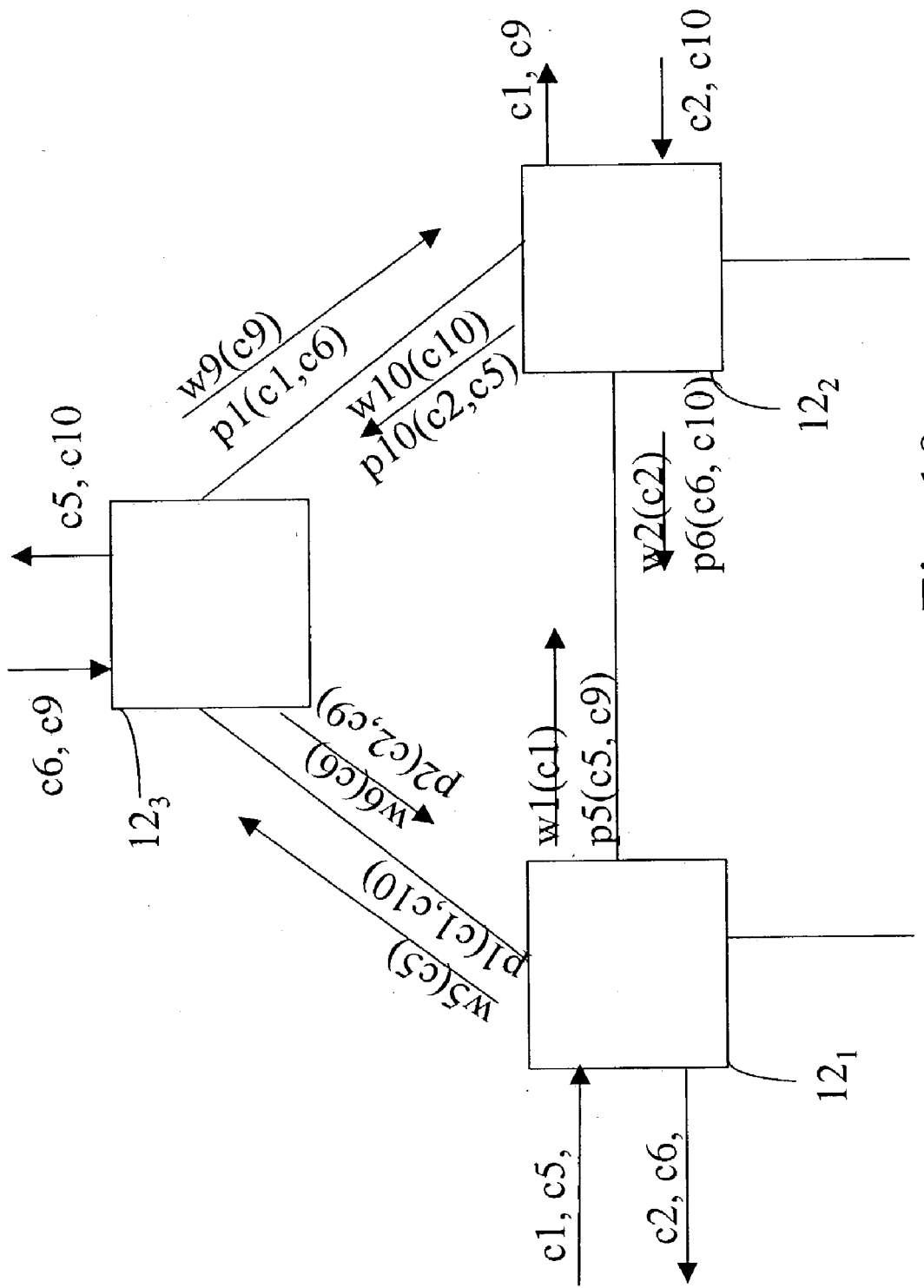
Figure 10B:
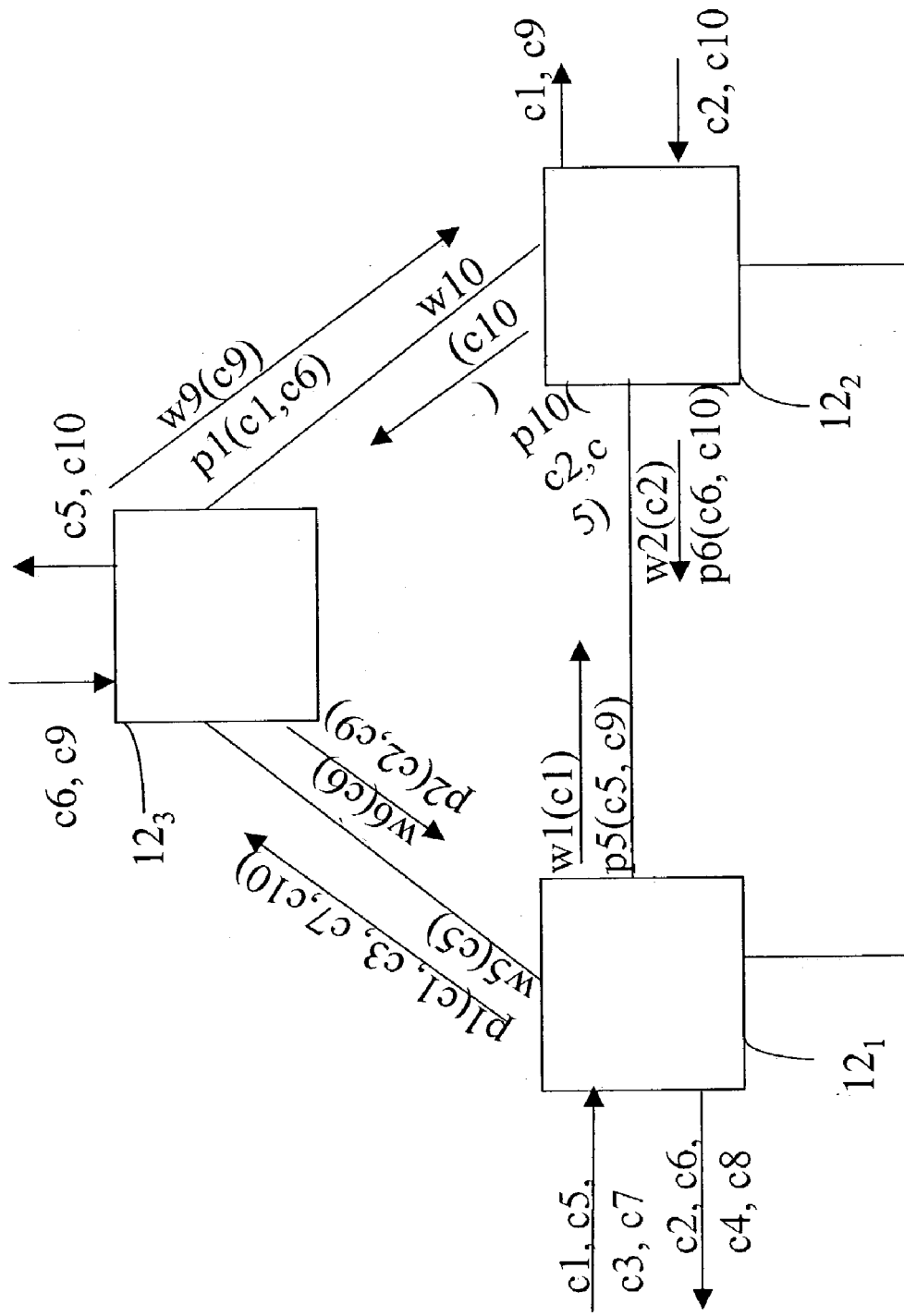

FIGS. 10a–10b depict various nodal configuration and traffic demands placed on the system 10 that can be protected via the protection net described with respect to FIGS. 6–9. FIG. 10a shows a system 10 including at least 3 nodes, $12_1$, $12_2$, and $12_3$, respectively. In the FIG. 10a example, six traffic demands (c1, c2, c5, c6, c9, c10) are placed on the network defined by the system 10. The demands provide connected as follows:

| Demand | Originating Node | Destination Node | Working Channel | Protection Channel(s) |
|---|---|---|---|---|
| c1 | 1 | 2 | w1 | p1, p9 |
| c2 | 2 | 1 | w2 | p2, p10 |
| c5 | 1 | 3 | w5 | p5, p9 |

-continued

| Demand | Originating Node | Destination Node | Working Channel | Protection Channel(s) |
|---|---|---|---|---|
| c6 | 3 | 1 | w6 | p6, p10 |
| c9 | 3 | 2 | w9 | p2, p5 |
| c10 | 2 | 3 | w10 | p1, p6 |

As shown in the above table and depicted in FIG. 10a, the six traffic demands placed on the system 10 can be protected by constructing a protection net using a single channel in each direction connecting the nodes.

FIG. 10b shows how preemptable traffic demands (c3, c4, c7, c8) can be provisioned over the protection net during normal operation. The preemptable traffic can be carried on the protection net in either direction using embodiments such as those in FIGS. 7a & 7b. It is noted that if the optical switch 42 embodiments do not include the optional cross-connect switch 60 in FIGS. 7a–7b embodiments, the preemptable demands would be provisionable over one protection path, instead multiple protection paths. It will be appreciated that the present invention can be extended to various numbers and configurations of nodes and the three and five node configurations described are exemplary.

When optical switch 42 are employed that provide for multiple client signal and-protection signals, such as in FIGS. 6b–6d, interconnected protection net layers can be implemented to provide additional levels of protection. In addition, the protection nets can be employed along with client shared protection schemes within a node.

Protection schemes of the present invention can be employed in opto-electronic network using dedicated transmission and switching equipment, as well as in all-optical networks that employ integrated optical transmission and switching. For example, in the FIGS. 8 & 9 embodiments, nodes 12₂ and 12₅ are shown as being configured to pass the protection channels through the nodes without providing terminating or requiring access to the protection channels. The optical bypass capability of nodes with integrated optical switching allows for the layering of protection channels to meet the protection demands between selected nodes in the network. Thus, the protection switching is only required in those nodes 12 that are directly impacted by the failure that triggered the protection. Conversely, in dedicated transmission and switching systems, all nodes along the protection path are impacted by the protection event.

In addition, nodes 12 that employ the optical switch 42 in combination with integrated optical switching devices, 26 and 28, can employ additional protection options. The integrated switching device can be configured to allow protection channels to bypass the node optically, unless the protection involves demands originating from or destined for that node. For example, when the optical switch 42 within the node 12 detects a failure of a demand, it can signal the integrated optical switching device within the node to drop and/or block the protection channel to allow the use of the channel by the optical switch 42 in node 12.

Those of ordinary skill in the art will further appreciate that numerous modifications and variations that can be made to specific aspects of the present invention without departing from the scope of the present invention. It is intended that the foregoing specification and the following claims cover such modifications and variations.

What is claimed is:

1. An optical system comprising:
    a first optical switch including at least distinct dedicated and shared protection sections;
    a first client optical transmitter in optical communication with said first optical switch;
    at least first and second receivers optically communicating with said first optical switch;
    wherein:
    said dedicated protection section includes: a splitter having a splitter input port optically communicating with a first switch input port and at least first and second splitter output ports;
    a first transmitter switch having a first input port in optical communication with said first splitter output port, a first output port in optical communication with said first receiver, and a second output port; and,
    a second transmitter switch having a first input port in optical communication with said second splitter output port, a second input port, and a first output port in optical communication with said first input port and said second receiver in a first switch state and in optical communication with said second input port and said second receiver in a second switch state.

2. The optical system of claim 1, wherein: said system includes at least a second client transmitter optical communicating with said second input port of said second transmitter switch.

3. The optical system of claim 2, wherein:
    said first optical switch includes a third transmitter switch having
    a first output port in optical communication with said second input port of said second transmitter switch,
    a first input port in optical communication with said second client transmitter and said first output port in a first state,
    a second input port in optical communication with a third transmitter and said first output port in a second state.

4. The optical system of claim 3, wherein said third transmitter includes an interface transmitter in electrical communication with a third receiver.

5. The optical system of claim 2, wherein:
    said second transmitter switch includes a third input port in optical communication with said first output port of said second transmitter switch; and,
    said system includes at least a third transmitter in optical communication with said third input port of said second transmitter switch.

6. The optical system of claim 1, wherein:
    said first and second receivers are first and second interface receivers in electrical communication with corresponding working and first protection optical transmitters in optical communication with working and first protection optical paths, respectively; and, said system includes working and first protection receivers in optical communication with said working and first protection paths respectively.

7. The optical system of claim 6, wherein:
    said working and first protection receivers are in electrical communication with working and first protection interface transmitters, respectively; and, said system includes a receiver switch includes working and first protection switch input ports in optical communication with said working and first protection interface transmitters, and a receiver switch output port in optical communication with said working switch input port in a first state and with said first protection switch input port in a second state.

8. The optical system of claim 1, wherein said shared protection section includes a switch fabric that provides communication between a first client transmitter and a first interface receiver in a first state and a first interface transmitter and said first interface receiver in a second state.

9. The optical system of claim 1, wherein said shared protection section includes a switch fabric that provides communication between a first interface transmitter and a first client receiver in a first state and said first interface transmitter and a first interface receiver in a second state.

10. The optical system of claim 1, wherein said dedicated protection section provides signals to said shared protection section.

11. The optical system of claim 1, wherein said first optical switch is configured to support establishing communication between said dedicated and shared protection sections without interrupting working traffic demands being carried by said dedicated protection section.

12. An optical system comprising:
a first optical switch including at least distinct dedicated and shared protection sections;
a first client optical transmitter in optical communication with said first optical switch;
at least first and second receivers optically communicating with said first optical switch,
wherein
said dedicated protection section includes:
a splitter having a splitter input port optically communicating with a first switch input port to receive a client signal from said first client transmitter, a first output port providing a replicate of the client signal as a working signal, and second splitter output port providing a replicate of the client signal as a dedicated protection signal to said second receiver;
a first transmitter switch having a first input port in optical communication with said first splitter output port, a first output port in optical communication with said first receiver, and a second output port.

13. The optical system of claim 12, wherein said shared protection section is in optical communication with said second output port of said first transmitter switch.

14. The optical system of claim 12, wherein said shared protection section support preemptible traffic.

15. The optical system of claim 12, further comprising a first receiver switch having a first output port configured to receive the working signal from the first receiver in a first state and the dedicated protection signal from said second receiver in a second state.

16. The optical system of claim 15, further comprising:
a first interface transmitter configured to transmit the working signal from the first receiver to the first input port of the first receiver switch,
a second interface transmitter configured to transmit the dedicated protection signal from the second receiver to the second input port of the first receiver switch.

17. The optical system of claim 12, wherein the dedicated protection section provides a dedicated protection output, a working channel output, and a shared protection output, wherein the shred protection output is connected to the input of the shared protection section and the working channel output and shared protection output are first and second outputs of a transmitter switch.

* * * * *

UNITED STATES PATENT AND TRADEMARK OFFICE
CERTIFICATE OF CORRECTION

PATENT NO. : 7,197,241 B2  
APPLICATION NO. : 10/373555  
DATED : March 27, 2007  
INVENTOR(S) : Weston-Dawkes et al.

It is certified that error appears in the above-identified patent and that said Letters Patent is hereby corrected as shown below:

Column 18, Claim 17, line 29, delete "shred" and replace with -- shared --

Signed and Sealed this

First Day of December, 2009

David J. Kappos  
*Director of the United States Patent and Trademark Office*